United States Patent
Inoue et al.

(10) Patent No.: US 6,295,503 B1
(45) Date of Patent: Sep. 25, 2001

(54) ROUTE SETTING DEVICE FOR SETTING A DESTINATION ROUTE FROM A DEPARTURE POINT TO A DESTINATION

(75) Inventors: Hiroki Inoue, Anjo; Masami Mikame, Okazaki, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/426,861

(22) Filed: Oct. 26, 1999

(30) Foreign Application Priority Data

Oct. 26, 1998 (JP) .................................................. 10-304144

(51) Int. Cl.⁷ ................................................ G06F 165/00
(52) U.S. Cl. ........................... 701/209; 701/210; 340/905
(58) Field of Search .................................... 701/209, 201, 701/206, 240; 340/905, 989

(56) References Cited

U.S. PATENT DOCUMENTS

| | | | |
|---|---|---|---|
| 5,752,217 | * 5/1998 | Ishizaki et al. ....................... | 701/201 |
| 5,842,146 | 11/1998 | Shishido . | |
| 5,899,955 | * 5/1999 | Yagyu et al. ........................ | 701/209 |
| 6,026,346 | * 2/2000 | Ohashi et al. ....................... | 701/210 |
| 6,029,110 | * 2/2000 | Zuber et al. ........................ | 701/200 |
| 6,039,139 | * 3/2000 | Breed et al. ......................... | 180/271 |
| 6,061,630 | * 5/2000 | Walgers et al. ..................... | 701/210 |
| 6,067,499 | * 5/2000 | Yagyu et al. ........................ | 701/201 |
| 6,098,016 | * 8/2000 | Ishihara ............................... | 701/209 |
| 6,134,501 | * 10/2000 | Oumi ................................... | 701/209 |

FOREIGN PATENT DOCUMENTS

| | | |
|---|---|---|
| 4-134600 | 5/1992 | (JP) . |
| 8-254433 | 10/1996 | (JP) . |
| 8-278157 | 10/1996 | (JP) . |

* cited by examiner

*Primary Examiner*—William A. Cuchlinski, Jr.
*Assistant Examiner*—Olga Hernandez
(74) *Attorney, Agent, or Firm*—Pillsbury Winthrop LLP

(57) ABSTRACT

A route setting device, which can provide a route setting device which realize a suitable route setting for each vehicle by using vehicle side data in order to comply with a situation where travel of the vehicle is permitted or prohibited based on the vehicle side data. An ECU sets a destination route by considering the number of passengers as vehicle side data. When the number is only one, that is only driver, the ECU sets the destination route without including carpool lane. On the contrary, when the number is two or more than two, the ECU calculates the destination including the carpool lane. Since many carpool lanes have some advantages compared to the normal roads such that the carpool lane is closer to an exit or the travel distance itself is shorter. Therefore, it can be expected that destination route is set more adequately by including the carpool lane.

28 Claims, 8 Drawing Sheets

ROUTE SETTING DEVICE FOR SETTING A DESTINATION ROUTE FROM A DEPARTURE POINT TO A DESTINATION

CROSS REFERENCE TO RELATED APPLICATION

This application is based upon Japanese Patent Application No. Hei. 10-304144 filed on Oct. 26, 1998, the contents of which are incorporated herein by reference.

BACKGROUND OF THE INVENTION

1. Field of the Invention

This invention relates to a route setting device and method, and especially to a route setting device and method for setting a destination route which is a route form a departure point to a set destination (target point), and a navigation system for performing route guidance concerning the destination route being set by the route setting device.

2. Related Art

There has been known a navigation system, which detects a present position changing as a vehicle travels by using GPS (Global Positioning System) or the like, displays the present position on a display unit with a road map, and performs a route guidance by setting an adequate route from the present position to a destination. Such a navigation system contributes smoother driving. As such a route setting, Dijkstra's algorithm or conformable method is used in general. Concretely, the route is set by the following steps. A route calculation cost (estimated value for each route) from a present position to each node is calculated by using a link connection data for a link between the nodes. After all of the cost calculations to the destination are completed, specific links are connected each other so that a total cost becomes minimum. A continuous link formed by connecting specific links is determined as the set destination route.

Here, because the route is continuous to the destination, roads into which a vehicle cannot enter such as one-way road or pedestrian-only road cannot be adopted as a part of the route. Therefore, when such a traffic regulation is detected from link connection data, the destination route is determined without using the road having such the traffic regulation.

By the way, not all the traffic regulations do not always uniformly regulate traffics of all the vehicles such as the above-described one-way road or pedestrian-only road. For example, freeways in metropolis of USA have a carpool lane system as the traffic regulation. Carpool lanes are provided for the purpose of recommending carpooling (riding together) to decrease the number of vehicles traveling the freeways. Concretely, the vehicle is allowed to travel the carpool lane when plural passengers are riding together thereon, and is regulated (prohibited) when the passenger is only one (only driver).

Here, some carpool lanes are defined by partitioning one of plural lanes by a lane defining line (or center line) or by a guardrail as shown in FIG. 10A, and some carpool lanes are provided independently from normal lanes (main lanes) as shown in FIG. 10B. Some carpool lanes change the traffic regulation based on time, month or season. When the driver makes a violation of the regulation, the driver is punished. However, some of such the carpool lanes are provided to have some advantages compared to the normal lanes. That is, the regulation described the above causes decreasing the number of vehicles traveling the carpool lanes so that the vehicles tend not to stuck a traffic congestion, the carpool lanes are near to exits, or route distances of the carpool lanes are shorter than those of normal lanes.

However, according to the conventional route setting device, the carpool lanes are substantially eliminated from consideration of the destination route setting by treating them as closed roads at all times or setting the route calculation cost very high at all times. In other words, since the traffic regulation of the carpool lane is so indefinite that the vehicle can not travel the carpool lane when the passenger is only one but can travel when the passenger is plural, the carpool lanes are substantially eliminated from consideration of the destination route setting in order to comply with even when the passenger is only one. Therefore, even when the vehicle complies with the condition that can travel the carpool lanes, that is, plural passengers are riding on the vehicle, a detour is set as the set destination route although a destination route including the carpool lanes is actually the nearest route, because the carpool lanes are eliminated from consideration.

The traffic regulation has explained by using the carpool lane, however, the other traffic regulations also exist. For example, there is a route that includes a tunnel through which only low-height vehicle whose height is lower than a predetermined value can pass or a route through which a large size vehicle cannot pass but a small size vehicle can pass. In this situation, too, all vehicles have to be uniformly regulated (prohibited) to travel. Therefore, the best destination route cannot be set for the vehicle actually permitted to travel such the lanes or roads.

In other words, the conventional route setting is based on only road-side data (e.g., link data or link connection data) but is not based on a condition of vehicle side.

SUMMARY OF THE INVENTION

This invention has been conceived in view of the background thus far described and its object is to provide a route setting device, which realize a suitable route setting for each vehicle.

Another object is to provide a route setting device which realize a suitable route setting for each vehicle by using vehicle side data (vehicle relevant data) in order to comply with a situation where travel of the vehicle is permitted or prohibited based on the vehicle relevant data.

According to the present invention, vehicle relevant data collecting means collects vehicle relevant data indicating whether a vehicle complies with a predetermined condition to travel a particular lane. Route setting means sets the destination route including the particular lane by using a node and a link of the particular lane when the vehicle complies with the predetermined condition.

When the particular lane has some advantages compared to normal roads such that the particular lane is closer to an exit or the travel distance itself is shorter, it can be expected that destination route is set more adequately by including the particular lane.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

A preferred embodiment adopting the present invention will be explained with reference to the accompanying drawings. Here, the present invention should not be limited to the following embodiments and modifications. For instance, the present invention may be modified in various ways without departing from the spirit of the invention.

Figure 1:
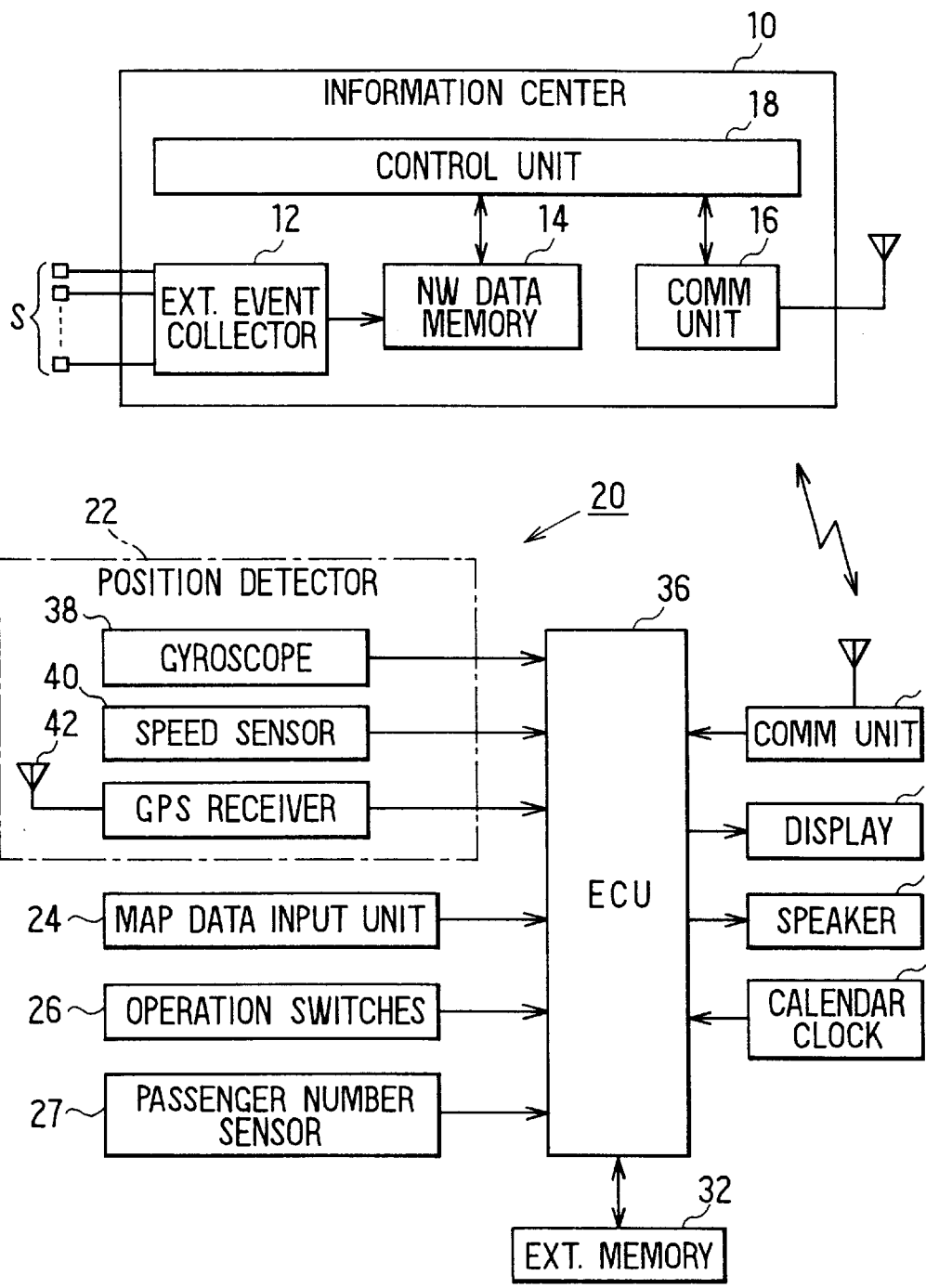
FIG. 1 is a schematic block diagram illustrating whole construction of a navigation system for mounting on a vehicle of a First Embodiment according to the present invention.

FIG. 1 is a schematic block diagram illustrating whole construction of a vehicle-mounted navigation system 20 of this embodiment. The vehicle-mounted navigation system 20 is provided with a position detector 22, a map data input unit 24, operation switches 26, a passenger number sensor 27, a display unit 28, a speaker 30, a calendar clock 31, an external memory 32, a communication unit 34 and an electronic control unit (ECU) 36.

The position detector 22 has a gyroscope 38, a vehicle speed sensor 40 and a GPS receiver 42 for GPS (Global Positioning System), which detects a present position of the vehicle based on radio from the satellite. Since each of these sensors 38, 40, 42 has tolerance different from each other, these sensors are used by interpolating with plural sensors. Here, the position detector 22 may employ only one of the above-described sensors when accuracy is satisfied. On the contrary, an earth magnetism sensor, a steering angle sensor or wheel sensors for each wheel may be used in addition to the above-described sensors 38, 40, 42.

The map data input unit 24 inputs map data stored in a memory (storing medium). Here, the map data includes data showing connecting condition of roads, map-matching data for improving position detection accuracy, and so on. The storing medium for storing the map data can be selected from CD-ROM or DVD because of its data amount; however, the other medium such as memory cards may be used.

The operation switches 26 consist of some kinds of switches for operating thevehicle-mounted navigation system 20, specifically, a switch for changing a display contents to be displayed on the display unit 28 or a switch for setting a route to a destination (destination route) by users. Here, the some kinds of switches may be used a touch switch integrated with the display unit 28 or mechanical switches.

The passenger number sensor 27 detects the number of passenger riding on the vehicle by using, for example, a pressure sensitive sensor provided in seats or an infrared ray sensor. The number of the passenger may be estimated by using a seatbelt-wearing sensor, which can detect the number of seatbelt being worn, or by image processing by shooting images in the vehicle to detect existence of the passengers.

The display unit 28 is a color display unit, and is capable of displaying a vehicle present position mark inputted from the position detector 22, the map data inputted from the map data input unit 24, and additional data such as a guidance route or a land mark of a setting point superimposed each other.

The speaker 30 informs the driver of route guidance by using voice sound. In this embodiment, the route guidance for the driver can be performed by both the display of the display unit 28 and the voice sound from the speaker 30. For example, in the case of a turning-right, the vehicle-mounted navigation system 20 outputs the voice sound such as "TURN RIGHT AT NEXT INTERSECTION". When the driver is informed by using the voice sound, the driver can drive more safety because the driver can obtain a traffic information at the set point without moving his/her eyes.

The calendar clock 31 is capable of counting calendar (Year, Month, Day, Day of week) and time (Hour, Minute, Second).

The external memory 32 stores a route set by the ECU 36. The stored data is backed-up by not-shown power supply.

The communication unit 34 receives information provided from an external information center 10 such as VICS (Vehicle Information and Communication System), and transmits information to external. The information externally received via the communication unit 34 is processed by the ECU 36. Here, a unit used as the communication device 34 can be selected from a movable communication device such as an automobile phone, a cellular phone, or a dedicated receiver.

The ECU 36 is formed from a normal computer system, and is provided therein with a CPU, a ROM, a RAM, an I/O and a bus line connecting these components. The ECU 36 controls the display unit 28, the speaker 30, the external memory 32 and the communication unit 34 based on inputs from the position detector 22, the map data input unit 24, the operation switches 26, the passenger number sensor 27 and the calendar clock 31, and executes processes including the route setting and route guidance.

Here, system of the information center 10 will be briefly explained.

The information center 10 is constructed from an external event collector 12, a road network data memory 14, a communication unit 16 and a control unit 18. The external event collector 12 collects external event information such as traffic condition from plural kinds of sensors S or the like provided closed to road (street). The road network data memory 14 stores road map data within a center area and plural kinds of traffic information, which is generated based on plural kinds of traffic regulations or external events collected by the external event collector 12. The communication unit 16 communicates with the vehicle-mounted navigation system 20 via wireless communication such as an automobile phone or a cellular phone. The control unit 18 is a main unit for performing a control, and specifies the traffic regulation and traffic congestion information of the particular roads based on the position data (present position and destination) received from the vehicle-mounted navigation system 20 and information stored in the road network data memory 14, and further transmits the specified traffic regulation and traffic congestion information via the communication unit 16.

The vehicle-mounted navigation system 20 constructed this way operates as follows. That is, after the driver inputs the destination by operating the operation switches 26, the ECU 36 automatically sets the most adequate destination route from the present position to the destination (route setting) and performs the guidance by displaying on the display unit 28 and outputting voice sound from the speaker 30 (route guidance).

The route setting of the ECU 36 is performed as follows. That is, after the driver inputs the destination based on the map on the display unit 28, the ECU 36 calculates the present position of the vehicle based on the satellite data received via the GPS receiver 42. After that, the ECU 36 calculates the cost between the present position and the destination by using the Dijkstra's algorithm, and determined the shortest route or a minimum-cost route between the present position and the destination as the guidance route. Finally, the ECU 36 displays the guidance route on the display unit 28 by superimposing with the road map so as to guide an adequate route to the driver.

Here, the route calculationusing the Dijkstra's algorithm is performed as follows. That is, a route cost (evaluated value for the route) fromthe present position till each node is sequentially calculated by using the link data for links among each nodes and the connecting link data among each links including the traffic regulation. After all the cost calculation till the destination complete, the links that the route cost becomes minimum are connected each other so to set the destination route. The route cost among each links using the Dijkstra's algorithm is calculated by using, for example, the following equation.

ROUTE_COST=LINK_LENGTH×ROAD_WIDTH_COEFFI-
CIENT×ROAD_KIND_COEFFICIENT×TRAFFIC_CON-
GESTION_FACTOR

Here, the road width coefficient is decided based on a road width, the road kind coefficient is decided based on the kind of road such as a toll road. The traffic congestion factor is decided based on the degree of the traffic congestion, and its initial value is "1". That is, when there is no traffic congestion, its value is set to "1" not to influence to the route calculation, and its value is set to large as the degree of the traffic congestion increases. The total route cost of the route till the destination is calculated by adding each route cost calculated by using the equation. After all the cost calculation till the destination complete, the links that the route cost becomes minimum are connected each other so as to set the destination route.

Here, because the route is continuous to the destination, roads into which a vehicle cannot enter such as one-way road or pedestrian-only road cannot be adopted as a part of the route. Therefore, when such a traffic regulation is detected from link connection data, the destination route is determined without using the road having such the traffic regulation.

By the way, not all the traffic regulations do not always uniformly regulate traffics of all the vehicles such as the above-describedone-wayroador pedestrian-onlyroad. For example, freeways in metropolis of USA have a carpool lane system as the traffic regulation. Carpool lanes are provided for the purpose of recommending carpooling (riding together) to decrease the number of vehicles traveling the freeways. Concretely, the vehicle is allowed to travel the carpool lane when plural passengers are riding together thereon, and is regulated (prohibited) when the passenger is only one (only driver).

Figure 10A:
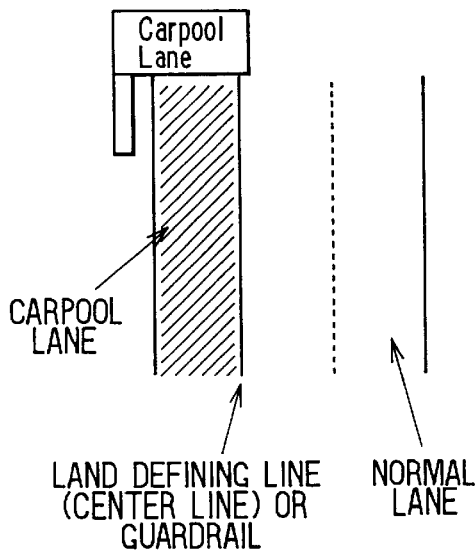
FIGS. 10A and 10B are diagrams illustrating the carpool lane.
Figure 10B:
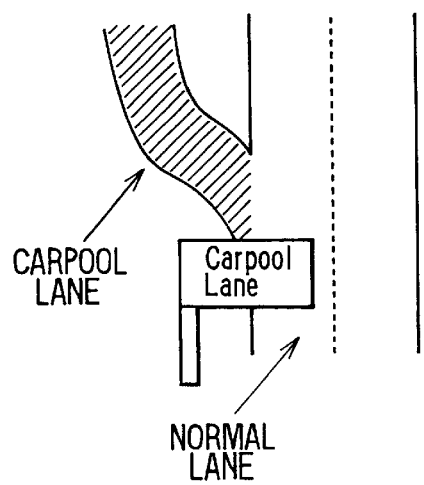

Here, some carpool lanes are defined by partitioning one of plural lanes by a lane defining line (or center line) or by a guardrail as shown in FIG. 10A, and some carpool lanes are provided independently from normal lanes (main lanes) as shown in FIG. 10B. Some carpool lanes change the traffic re gulation based on time, month or season. When the drivermakes aviolationof the regulation, the driver is punished. However, s ome of such the carpool lanes are provided to have some advantages compared to the normal lanes. That is, the regulation described the above causes decreasing the number of vehicles traveling the carpool lanes so that the vehicles tend not to stuck a traf fic congestion, the carpool lanes are near to exits, or route distances of the carpool lanes are shorter than those of normal lanes.

However, according to the conventional route setting device, the carpool lanes are substantially eliminated from consideration of the destination route setting by treating them as closed roads at all times or setting the route calculation cost very highat all times. In other words, since the traffic regulation of the carpool lane is so indefinite that the vehicle can not travel the carpool lane when the passenger is only one but can travel when the passenger is plural, the carpool lanes are substantially eliminated from consideration of the destination route setting in order to comply with even when the passenger is only one. Therefore, even when the vehicle complies with the condition that can travel the carpool lanes, that is, plural passengers are riding on the vehicle, a detour is set as the set destination route although a destination route including the carpool lanes is actually the nearest route, because the carpool lanes are eliminated from consideration.

On the contrary, this vehicle-mounted navigation system judges whether the vehicle can travel the carpool lane or not by taking the passenger number data into consideration. When the vehicle complies with a condition that two or more passengers are riding thereon, the carpool lane is treated as a link to be included to the route setting with the same condition as the other road without treating as a special road. By processing this way, a destination route including the carpool lane having such the advantage can be easily set, and the adequate route setting can be realized.

Now, operations of the vehicle-mounted navigation system of this embodiment will be explained hereinafter with reference= to FIGS. 2 through 9.

In the memory into which the data is input via the map data input unit 24, the road network data to be treated by the vehicle-mounted navigation system 20 is stored. There are two formats in the road network data, that is, the link data and the node data. The link data include "link ID" which is a unique number to specify the link; "link class" to identify the kind of road such as the high way, the toll road; the carpool lane or normal road; "start coordinates" and "end coordinates" of the link; and data concerning link itself such as "link length" showing a length of the link and so on. On the contrary, the node data include "node ID" which is a unique number of the node connecting the links; data for indicating "No right/left turn" at an intersection and existence or not of signal, and so on.

Here, the vehicle-mounted navigation system 20 considers the number of the passenger while the route setting so as to adequately setting the destination route for route guidance, when the vehicle travels the carpool lane which changes the travel regulation (permission or prohibition of traveling) based on the number of the passenger.

The route setting of this embodiment will be explained in detail hereinafter with reference to the accompanying drawings.

Figure 2:
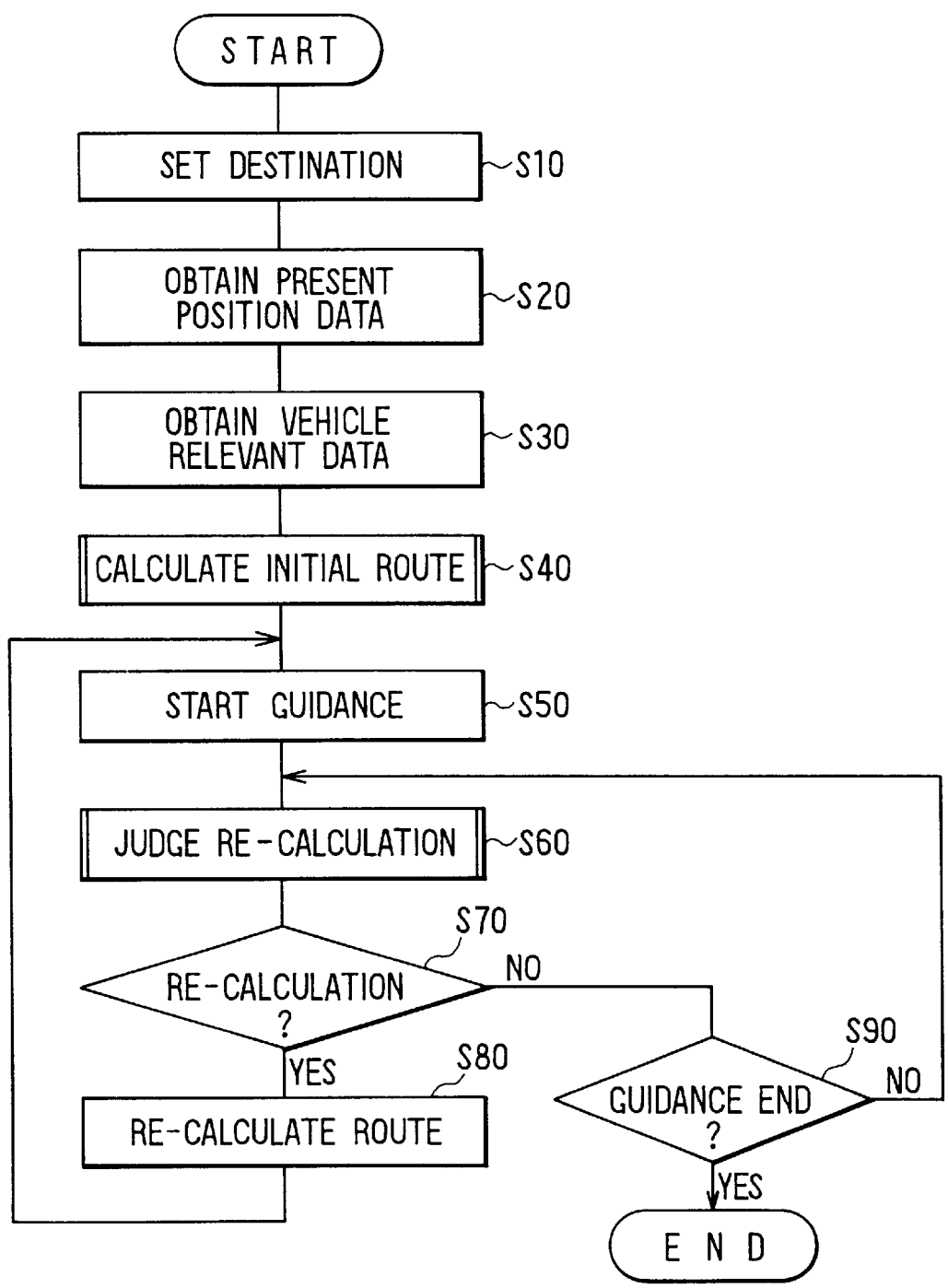
FIG. 2 is a flowchart of a main process executed by an ECU of the First Embodiment.

FIG. 2 is a flowchart of a main routine executed by the ECU 36. After the main routine is started, the ECU 36 sets a destination at initial step S10. In detail, when the driver inputs the destination based on a map displayed on the display unit 28 by operating the operation switches 26, the ECU 36 sets the destination in response to the operation. Next, the ECU 36 calculates a present position of the vehicle based on the data from the position detector 22 at step S20. At step S30, the ECU obtains present "vehicle relevant data". In detail, the ECU 36 obtains the number of passenger including the driver as the present vehicle relevant data based on sensor signal from the passenger number sensor 27. After that, the ECU 36 executes initial route calculation at step S40.

Here, the initial route calculation at step S40 will be explained in detail with reference to FIG. 3.

Figure 3:
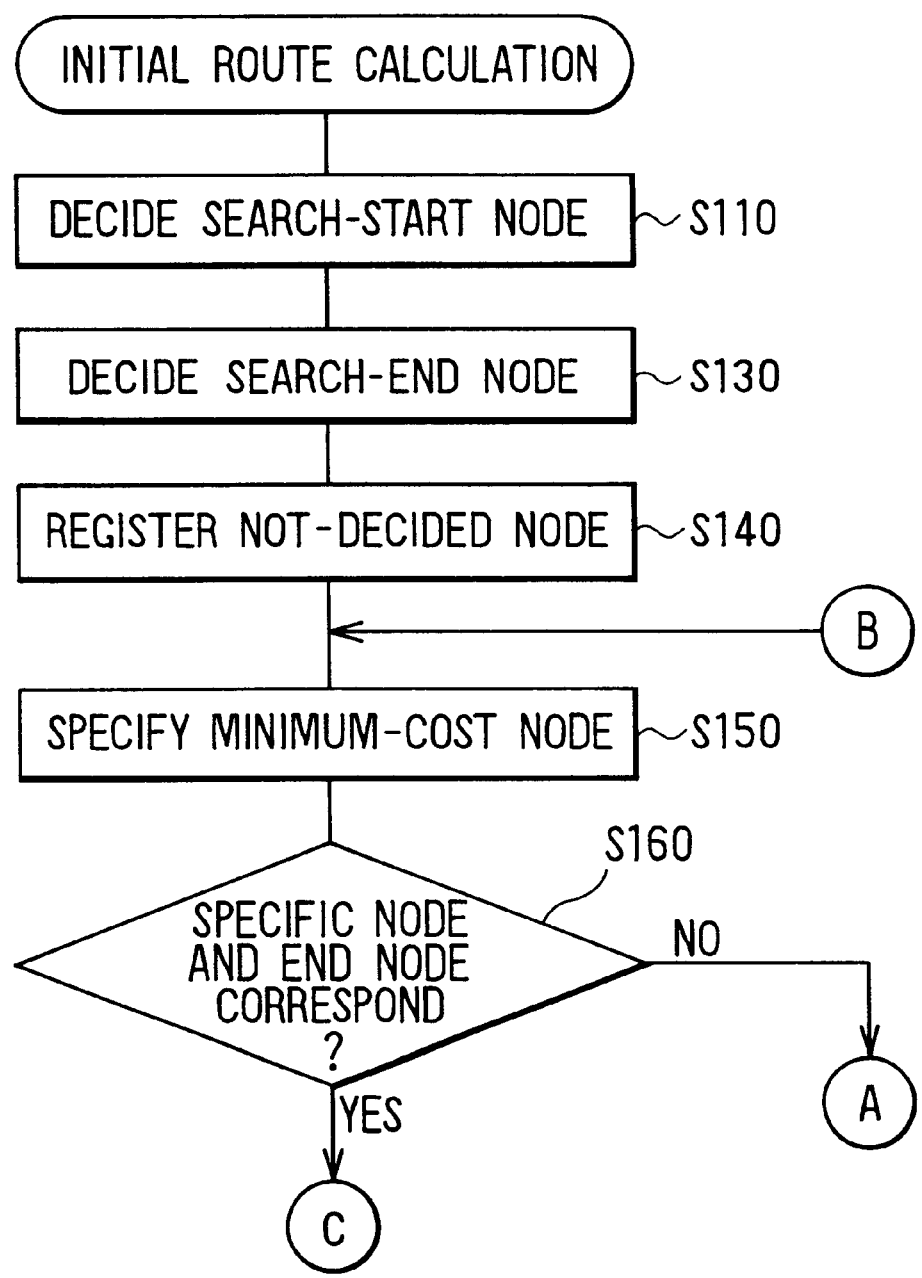
FIGS. 3, 4, 5 and 6 are flowcharts of parts of an initial route calculation routine executed by the ECU of the First Embodiment.

When the initial route calculation routine shown in FIG. 3 starts, the ECU 36 decides a search-start node at step S110, and decides asearch-endnodeat step S130. Here, thesearch-start node is decided by the following steps at step S110. That is, the ECU 36 searches a link closest to a departure point based on coordinates of the departure point. After that, the ECU 36 calculates a basis point at where perpendicular line from the coordinates crosses the closest link. The ECU 36 decides a node closer to the basis point out of both end nodes as the search-start node. Similarly, the search-end node is decided by the following steps at step S130. That is, the ECU 36 searches a link closest to a destination based on coordinates of the destination. After that, the ECU 36 calculates a basis point at where perpendicular line from the coordinates crosses the closest link. The ECU 36 decides a node closer to the basis point out of both end nodes as the search-end node.

At step S140, the ECU 36 registers the search-start node as a not-decided node. At step S150, the ECU 36 specifies a minimum-cost node out of the not-decided nodes (hereinafter, specific node). At step S160, if the specific node does not accord with the search-end node (S160: NO), the ECU 36 searches a link connecting with the specific node at step S170 in FIG. 4.

At step S180, the ECU 36 judges the searched link (if there are plural searched links, one of them) whether the searched link includes data regarding the carpool lane regulation by checking whether the link class of the link data is the carpool lane or not. Here, in the present carpool lane system, a travel permission/prohibition condition may be changed depending on the time, month or season. Therefore, in such the case, the ECU 36 may detect whether the searched link is the carpool lane or not at that time based on the date and time data obtained from the calendar clock 31 (see FIG. 1). Furthermore, in the case the travel permission/prohibition condition of the carpool lane is changed depending on the time, it is preferable to detect the travel permission/prohibition condition at the time when the vehicle reaches the entrance of the carpool lane. In detail, the ECU 36 may judge by taking an expected arrival time to the carpool lane into consideration.

When the ECU 36 judges that the link is the carpool lane (S180: YES), the ECU 36 judges that the number of the passenger obtained at step S30 in FIG. 2 is to or more than two at step S190.

When the ECU 36 judges that the number of the passenger is two or more than two (S190: YES), the ECU 36 calculates cost to a connection node at step S200, and registers the connection node as the not-decided node at step S220.

When the ECU 36 judges that the number of the passenger is only one (driver only) (S190: NO), the ECU 36 executes step S230 without executing steps S200 and S220. In other words, since the cost-calculation for node is not performed in this case and the node is not registered as the not-decided node, the node remains as a not-searched node.

On the contrary, when the ECU 36 judges that the searched link is not the carpool lane (S180: NO), the ECU 36 executes step S200 without executing the judgment of the number of the passenger at step S190.

At step S230, the ECU 36 judges whether all routines for all calculation connection nodes are completed or not. Here, "all calculation connection nodes" means all nodes connecting to the node specified as the minimum-cost node out of the not-decided nodes. When the ECU 36 judges that all routines for all calculation connection nodes are not completed (S230: NO), the ECU 36 returns its routine to step S180 to execute routines of S180 and later. On the contrary, when the ECU 36 judges that all routines for all calculation connection nodes are completed (S230: YES), the ECU 36 returns to step S150 in FIG. 3. In this way, the above-described routines are repeated till the specific node accords with the search-end node. When the specific node accords with the search-end node (S160: YES), the ECU 36 moves its routine to step S240 because it shows end of a route searching.

Figure 7:
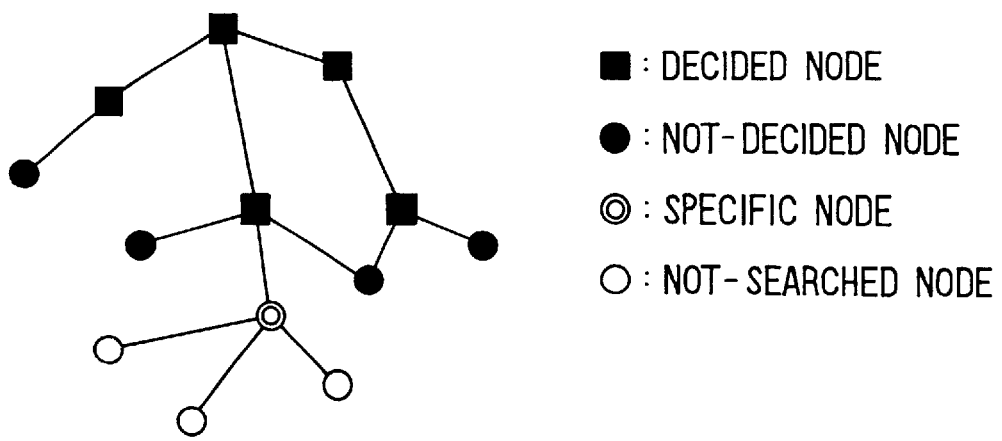
FIGS. 7, 8A, 8B and 8C are schematic diagrams for illustrating a route setting method.

Before an explanation of routines of step S240 and later, a concept of a route searching method will be briefly explained with reference to FIGS. 7, 8 in order to facilitate an understanding of the route searching.

First of all, kinds of nodes in the route searching will be explained with reference to FIG. 7. In this embodiment, the nodes are classified the following 4 kinds, that is a decided node as shown by "■" in FIG. 7 (FIGS. 8A–8C), a not-decided node as shown by "●" a specific node as shown by "◎" and a not-searched node as shown by "○". The decided node indicates a nodethat has already searched and its cost has decided. The not-decided node indicates a node that has already searched but its cost has not decided. The specific node indicates anode having aminimum-cost, which is elected only one out of the not-decided nodes. The ECU 36 searches the node connecting with the specific node by using this specific node as a basis (see step S170 in FIG. 4). The specific node is classified in the decided node. The not-searched node indicates a node that has not searched yet.

Figure 8A:
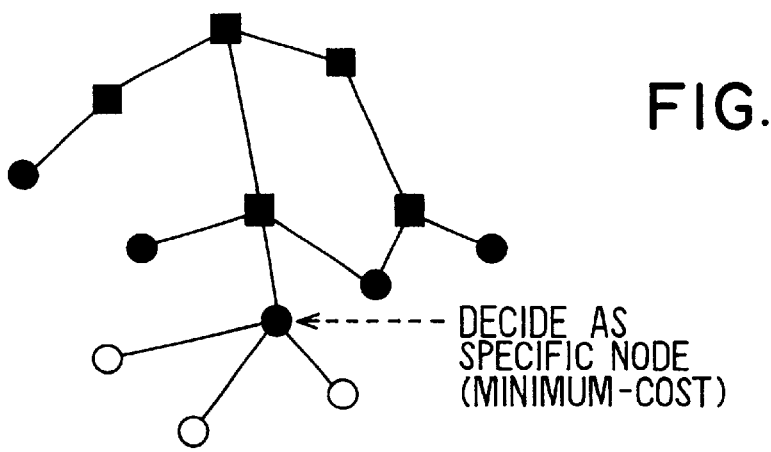
Figure 8B:
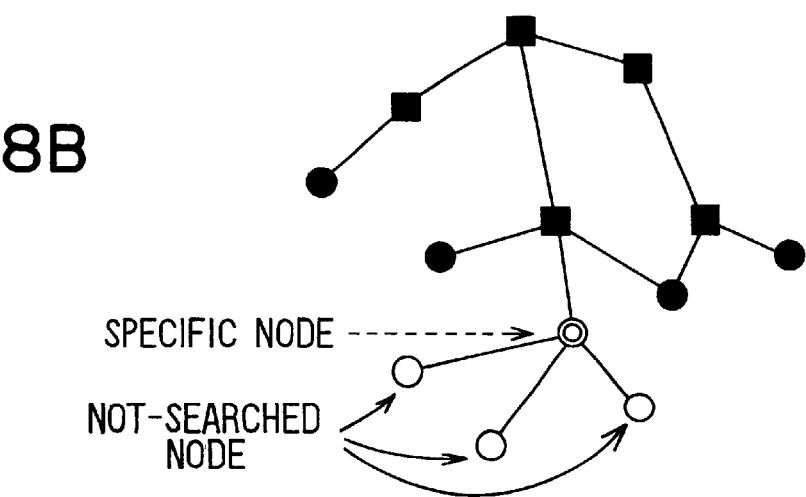
Figure 8C:
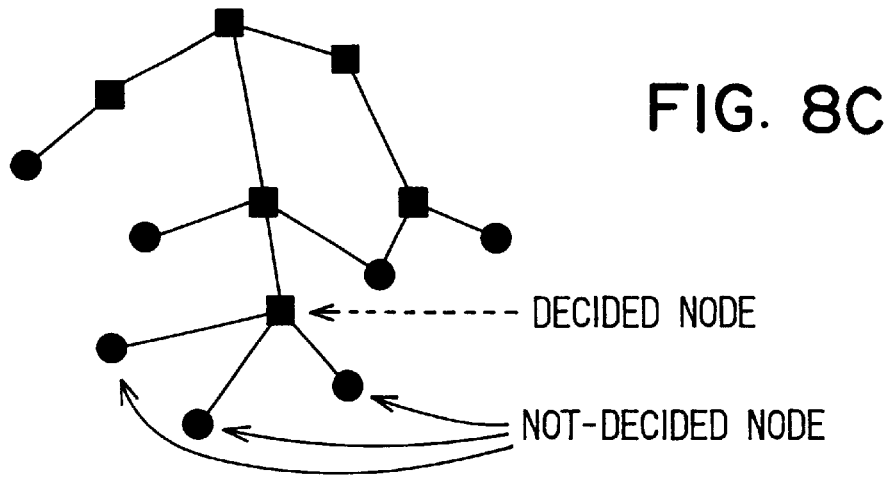

Next, a transition from the not-decided node to the decided node and a transition from the not-searched node to the searched node will be explained hereinafter with reference to FIGS. 8A–8C. Here, the following explanation is presumed that there are five not-decided nodes (●) connecting with the decided node (■). In these five not-decided nodes, one not-decided node having a minimum-cost is decided as the specific node (◎) (see FIG. 8B). And then, three not-searched node (○) connecting with the specific node (◎) becomes nodes to be searched. Therefore, the three nodes become the not-decided nodes as shown in FIG. 8C after searching. The route from the search-start node to the search-end node is set by repeating the above-described routines.

Figure 5:
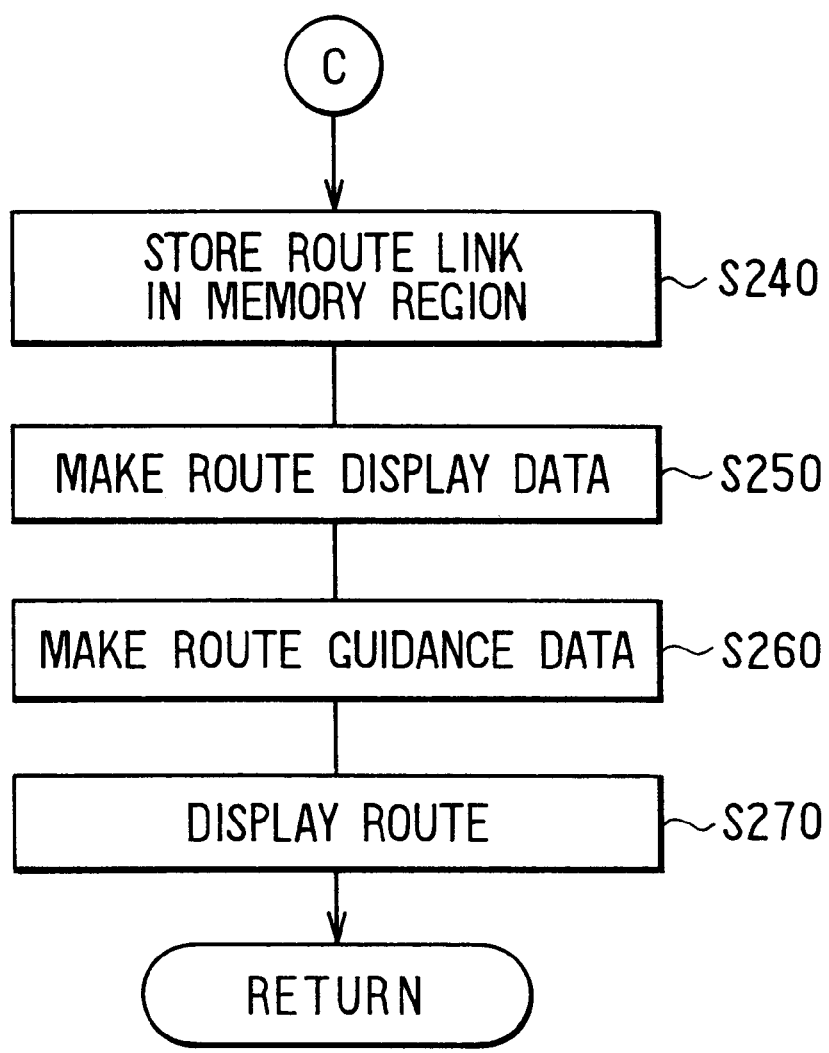

Here, the routines of step S240 and later in FIG. 5 will be explained in detail with reference to the flowchart.

Figure 4:
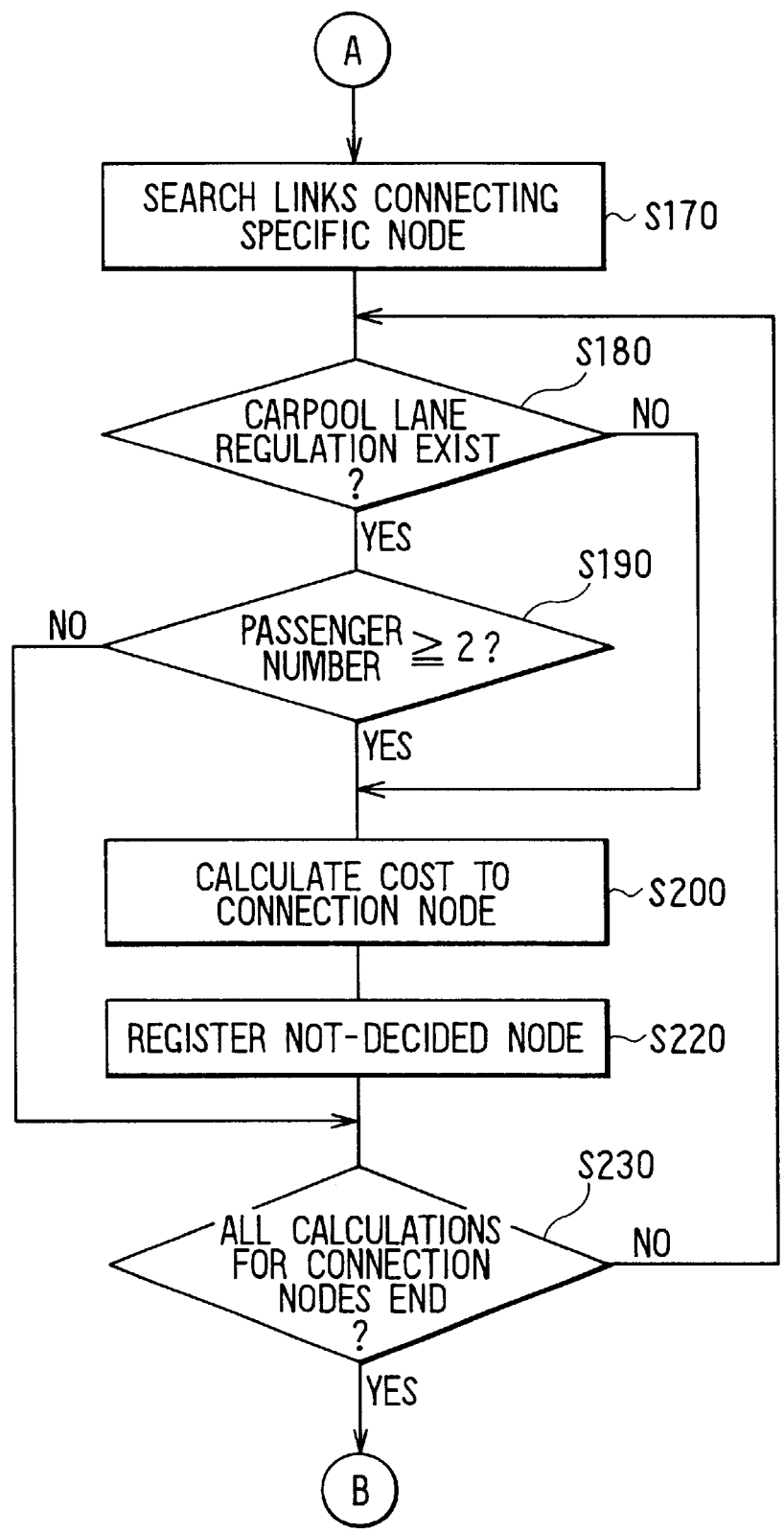

At step S240, the ECU 36 stores a route link have been set in the routines until step S230 in FIG. 4 into a not-shown memory region. At step S250, the ECU 36 generates route display data using the stored route link. After that, the ECU 36 generates route guidance data at step S260, displays the route at step S270, and discontinues this routine.

After the initial route calculation routine is ended, the ECU 36 moves to step S50 in FIG. 2 to start the travel guidance. That is, the ECU 36 displays the guidance route by superimposing with the road map on the display unit 28 so as to start route guidance for the driver.

After starting the route guidance in this way, the ECU 36 judges a necessity of re-calculation at step S60. This step S60 will be explained in detail later. When the ECU 36 judges that it needs to re-calculate (S70: YES), the ECU 36 calculates the destination route again at step S80. The route re-calculation at step S80 is the substantially same routine as that of the initial route calculation at step S40 except of the search starting point. After the re-calculation, the ECU 36 returns to step S50 to continue the route guidance, and further judges the necessity of re-calculation at step S60. On the contrary, when the ECU 36 judges that it does not need to re-calculate (S70: NO), the ECU 36 judges whether the route guidance is ended or not at step S90. When the ECU 36 judges that the route guidance is not ended (S90: NO), the ECU 36 returns to step S60. When the ECU 36 judges that the route guidance is ended (S90: YES), the ECU discontinues the main routine.

In this way, after starting the route guidance based on the route calculated and set by using the route calculation (S50), the ECU 36 judges the necessity of re-calculation at all times (S60), and executes the re-calculation of the destination route when it is needed to re-calculate (S80). In other words, the route recalculation is repeatedly executed, if necessary.

Here, the judgment of the re-calculation at step S60 will be explained in detail with reference to FIG. 6.

Figure 6:
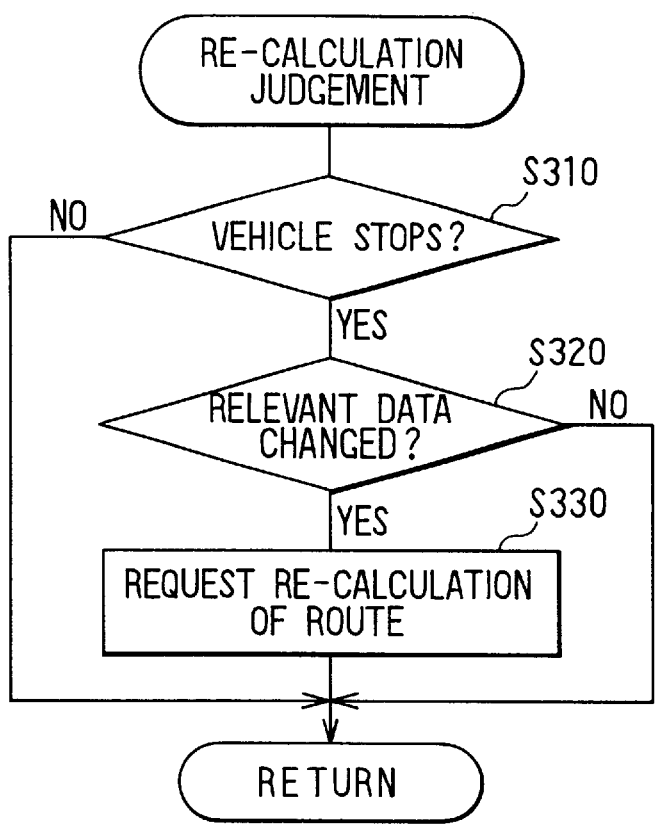

After starting the re-calculation judgment routine in FIG. 6, the ECU 36 judges whether the vehicle stops (or has been stopping) or not at step S310. This stop can be detected based on an output of the vehicle speed sensor 40 (see FIG. 1).

When the ECU 36 judges that the vehicle stops (S310: YES), the ECU 36 judges whether the vehicle relevant data has changed or not at step S320. That is, the ECU 36 judges whether the number of the passenger has changed or not. Here, the ECU 36 judges the change of the number of the passenger only when the vehicle stops, because the number of the passenger generally does not change during traveling.

When the ECU 36 judges that the number of the passenger has changed (S320: YES), the ECU 36 requests the re-calculation of the destination route at step S330. After that, the ECU 36 discontinued this routine, and moves to step S70 in the main routine in FIG. 2. In this case, since the re-calculation is requested, the ECU 36 affirmatively judges at step S70 to execute the recalculation of the destination route at step 80.

On the contrary, when the ECU judges that the number of the passenger has not changed (S320: NO), the ECU 36 discontinues this routine to move to step S70 of main routine in FIG. 2. In this case, because the re-calculation is not requested, the ECU 36 negatively judges at step S70 to move to step S90. That is, the ECU 36 does not execute the re-calculation of the routine at step S80.

As has explained the above, this vehicle-mounted navigation system 20 sets the destination route by taking the number of the passenger as the vehicle relevant data into consideration. That is, when the passenger is only one (S190: NO), the ECU 36 does not consider the carpool lane in the route calculation by treating the carpool lane as a closed road. When the passenger is to or more than two (S190: YES), the ECU 36 considers the carpool lane as well as the other roads to include the carpool lane into the destination route, if necessary.

Therefore, in the case where the number of the passenger is to or more than two, the ECU 36 can set the destination route having some advantages by including the carpool lane in the route calculation, compared to the case where the ECU 36 does not include the carpool lane in the route calculation. As has described the above, many the carpool lanes have some advantages compared to the normal roads such that the carpool lane is closer to an exit or the travel distance itself is shorter. Therefore, it can be expected that destination route is set more adequately by including the carpool lane.

Figure 9A:
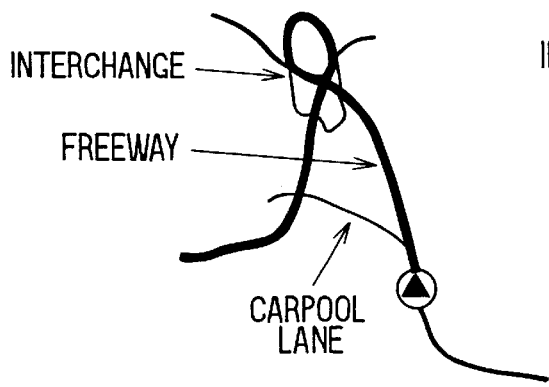
FIG. 9A is schematic diagram illustrating a route setting when a carpool lane exists in a condition where a passenger is only one.
Figure 9B:
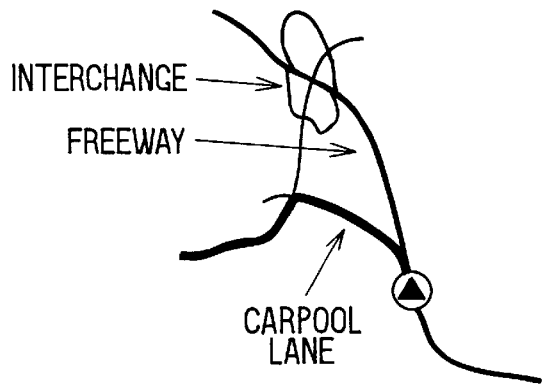
FIG. 9B is schematic diagram illustrating the route setting when the carpool lane exists in a condition where a passenger is plural.

FIGS. 9A and 9B are diagrams for explaining the difference between the case where the carpool lane is included in the calculation and the case where the carpool lane is not included therein. As can be intuitively understood, a travel distance of the destination route (see FIG. 9B) being set when plural passengers ride in the vehicle (that is, the number is passenger is to or more than two) is shorter than that of the destination route (see FIG. 9A) being set when only the driver rides in the vehicle (that is, the number is passenger is one).

That is, the conventional route setting sets the destination route without including the carpool lane but including some detours, as shown in FIG. 9A, because the conventional route setting treats the carpool lane as a not-available road (or closed road). On the contrary, the vehicle-mounted navigation system 20 of this embodiment can set advantageous destination route including the carpool lane as shown in FIG. 9B, when the passenger is to or more than two.

Here, because the vehicle relevant data such as the number of the passenger may be dynamically changed, this vehicle-mounted navigation system 20 re-calculates the destination route by using the changed vehicle relevant data (step S330 in FIG. 6, steps S70 and S80 in FIG. 2) when the vehicle relevant data is changed (S320 in FIG. 6: YES). As has described, in the case of the carpool lane, the travel permission/prohibition condition of the vehicle is decided based on the number of the passenger. Even when the destination route including the carpool lane was not set in the previous setting because the number of the passenger was only one, this vehicle-mounted navigation system 20 can re-set the destination route including the carpool lane after the number of the passenger increase two or more than two.

Here, it might be redundant to execute the judgment process while the vehicle relevant data such as the number of the passenger is not actually changed. For example, the number of the passenger or the existence of the passenger having a specific attribute is changed while the vehicle is stopping in general. Therefore, this vehicle-mounted navigation system 20 judges the change of the vehicle relevant data when the vehicle stops (step S310 in FIG. 6). Hence, redundant judgment processes can be eliminated.

In this embodiment, the number of the passenger is automatically detected by using the passenger number sensor 27 at step S30; however, it is also preferable to input the number of the passenger to the ECU 36 through the operation switches by user.

Here, it is preferable to adopt the passenger number sensor 27, which is capable of automatically detect, because the adequate route may not be set when the user overlooks to input the number of the passenger. Therefore, to prevent such the overlooks, it is preferable to notify the driver with sound such as voice or alarm, or to display message on the display 28.

That is, after obtaining the destination at step S10 or after present obtaining the position data at step S20 in FIG. 2, the CPU 36 displays a message such as "DO YOU TRAVEL CARPOOL LANE?" or "HOW MANY PASSENGERS ARE RIDING ON?" on the display 20 with voice sound of the message. After the driver inputs the data for the message and the ECU 36 receives that data, the ECU 36 executes step S40 in the same way as explained the above.

In the above embodiment, the judgment process is executed when the vehicle stops. Here, it is preferable to execute this process when one of doors is opened when the vehicle stops. Of course, it is acceptable to execute the judgment process when one of the doors is open independent from the vehicle's stop (without detecting the vehicle's stop). Hence, it can further eliminate redundant judgment process to detect the change of the number of the passenger.

Furthermore, as can be understood from the flowchart in FIG. 4, when the vehicle does not comply with the condition for traveling the carpool lane, that is "the number of the passenger is two or more than two" (S190: NO), the ECU 36 does not execute the cost calculation (S200) by excluding it from the route setting. However, as the other countermeasures, the ECU 36 may calculate the cost as usual after setting the cost for link to very high, when the vehicle does not comply with the condition. This method also obtains similar result, because such the link whose cost is set very high may not be substantially included.

[Modification]

In the above embodiment, the carpool lane is used as an example of "particular road" and the number of the passenger is used as an example of "vehicle relevant data", however, the present invention can be adopted to the other systems.

[1] As dynamic data, which maybe dynamically changed, "existence of the passenger having a specific attribute" can be used, for example, as well as the number of the passenger. The passenger having a specific attribute includes such as an infant, a beginner driver and a driver of advanced age. Vehicle in which the infant rides or by which the beginner driver or the driver of advancedagedrivesmaybedrivenslowlycomparedtotheothervehicles. Therefore, it may be preferable for both own vehicle and other's vehicle to avoid own vehicle's traveling on a heavy traffic road which many large-size transporters such as trucks travel. Therefore, when the vehicle complies with such a condition, the ECU 36 sets the destination route without including such a specific road. In this case, it needs to set such a road as the "specific road" as the link class of the link data or as the other data, and so does the following example.

Furthermore, when the ECU 36 detects whether an infant rides or not, the ECU 36 may detect whether a seat belt of a child seat is worn, or may detect an existence of an infant by shooting an image in the vehicle.

[2] In the above embodiments, the dynamic vehicle relevant data has considered. However, the present invention can be adopted to static data such as vehicle attribute data.

The vehicle attribute data includes data relates to such as: the kind of engine mounted on the vehicle; performance specifications of the engine; size or weight of the vehicle; or the kind of the vehicle.

For example, when it is set a road which only electronic vehicles can travel as a result of the exhaust gas regulation or the noise regulation, the vehicle-mounted navigation system 20 can set a destination route including such the road only when the vehicle-mounted navigation system 20 is mounted on the electronic vehicle. In this case, the vehicle-mounted navigation system 20 may set to include hybrid vehicles or gasoline engine vehicles, which clear a predetermined standard, when the road permits. Furthermore, from the exhaust gas regulation point of view, it may classify based on a piston displacement or the like. That is, the ECU 36 can set a destination route including roads which only specific vehicles having to or less than a predetermined piston displacement can travel.

As the performance specification of the engine, there is maximum power output or maximum torque. For example, when there is a steep road, it is decided the minimum engine performance enough to travel such the steep road adequately. Therefore, the ECU 36 includes such the steep road to the destination route when the vehicle complies with the engine performance condition.

Regarding the vehicle size, it is preferable to consider not-regularly roads such as a road having a height regulated tunnel, a narrow road having a width regulation and a road having a corner whose allowed minimum turning radius is regulated. Regarding the weight, it is preferable to consider a road having a bridge having maximum weight regulation.

Regarding data relates the kinds of the vehicle, it is preferable to "classify by use" such as passenger cars, commercial cars and freight cars, or "classify by road traffic low" such as large size cars, middle size cars, large special cars and small special cars (In the case of Japanese traffic low). This classification and regulation are based on a view of traffic administration. For example, there are road which the large size cars or large special cars are prohibited to travel, and road which small size motorcycles are prohibited to travel, on the contrary. Since whether such the roads are included to the destination route depends on the kinds of the own vehicle, it is preferable to set the destination route by considering them. Furthermore, since the administration may regulates use of the passenger cars and facilitates travel of the commercial cars and the freight cars, the ECU 36 may set the destination route based on the use of the ts vehicle.

Here, off-road cars are manufactured for the purpose of traveling bad roads. Therefore, in the case of specific road such as the bad road, the off-road cars can set the bad road to the destination route, while the other cars cannot set it to the destination route.

Furthermore, a license number of the vehicle or travel permission of the specific roads may be used as the static data.

In the case of the license number, the system using the present invention is further effective. For example, when whether the travel of the vehicle is permitted or not depends on the ending numeral of the license number and the day of the week, the ECU 36 automatically sets the destination route excluding roads which his/her vehicle cannot travel, even when the driver does not know the day of the week his/her vehicle can travel. Furthermore, when the license number includes therein some characters other than the numerals, the ECU 36 may adopt the character instead of the ending numeral to decide the destination route. That is, it is acceptable to employ any data, which can obtain from the license number instead of the ending number or the character.

Here, in the case of the data regarding travel permission/prohibition for specific roads, it can be thought the following situations.

For example, it is effective to be employed to a system in which automatically collects a toll of a toll road (that is, automated toll-collection system in which the vehicle pass through a tollgate is determined by communicating between the vehicle side and the tollgate side, and automatically debiting the toll from a driver's account or a vehicle owner's account). In this case, it needs to mount a communication device for the automated toll-collection system on the vehicle. When it is in a transition stage during which not all the vehicles are obligated to mount such the communication device, traveling lanes in the tollgate would be separated each other based on that the vehicle mounts such the communication device or not (that is, the vehicle is adaptable for the automated toll-collection system). Therefore, when the vehicle mounts such the communication device, the ECU 36 sets the destination route including traveling lanes or traveling roads adaptable for the automated toll-collection system.

Furthermore, when the vehicle is specially permitted to travel roads, which is not generally determined as public roads, such as a situation where the vehicle is permitted to travel specific private roads, the ECU 36 can include such the specific roads to the destination route.

The above embodiments has explained by using several examples to explaining the drastic data and the static data, however, it is acceptable to use vehicle relevant data corresponding artificially decided separation in view of several points such as a traffic administration point of view for controlling the number of the vehicles, or a environmental protection point of view such as an emission control. That is, the vehicle-mounted navigation system 20 of the present invention can be totally adopted to situations where vehicles are classified into travel-permitted vehicles and travel-prohibited vehicles even they travels same road in view of the traffic administration, the environmental administration or the other administrative point of view in the future.

What is claimed is:

1. A route setting device for setting a destination route from a departure point to a destination, comprising:

vehicle relevant data collecting means for collecting vehicle relevant data indicating whether a vehicle complies with a predetermined condition to travel a particular lane; and route setting means for setting the destination route based on link data of links connecting specific nodes and connection data between the specific links, wherein the route setting means sets the destination route including the particular lane by using a node and a link of the particular lane when the vehicle complies with the predetermined condition, wherein the vehicle relevant data includes dynamic data, which dynamically changes, and wherein the vehicle data collecting means detects the number of passengers actually riding on the vehicle as the dynamic data includes.

2. A route setting device according to claim 1, wherein the route setting means sets the destination route using a link of a carpool lane and links of lanes other than the carpool lane when the number of the passengers including a driver is to or more than two.

3. A route setting device for setting a destination route from a departure point to a destination, comprising:

vehicle relevant data collecting means for collecting vehicle relevant data indicating whether a vehicle complies with a predetermined condition to travel a particular lane; and route setting means for setting the destination route based on link data of links connecting specific nodes and connection data between the specific links, wherein the route setting means sets the destination route including the particular lane by using a node and a link of the particular lane when the vehicle complies with the predetermined condition, wherein the vehicle relevant data includes dynamic data, which dynamically changes, and wherein the route setting means re-sets the destination route by using a changed vehicle relevant data when the vehicle relevant data changes.

4. A route setting device according to claim 3, further comprising judging means for judging whether the vehicle relevant data has changed or not when the vehicle stops.

5. A route setting device according to claim 4, wherein the judging means includes a sensor for automatically detecting the change of the vehicle relevant data.

6. A route setting device for setting a destination route from a departure point to a destination, comprising:

vehicle relevant data collecting means for collecting vehicle relevant data indicating whether a vehicle complies with a predetermined condition to travel a particular lane; and route setting means for setting the destination route based on link data of links connecting specific nodes and connection data between the specific links, wherein the route setting means sets the destination route including the particular lane by using a node and a link of the particular lane when the vehicle complies with the predetermined condition, wherein the judging means includes a sensor for automatically detecting the change of the vehicle relevant data.

7. A route setting device according to claim 6, wherein the vehicle relevant data collecting means uses vehicle attribute data indicating a attribute of the vehicle as the static data.

8. A route setting device according to claim 7, wherein the vehicle attribute data includes data regarding one of the kinds and performance of an engine mounted on the vehicle.

9. A route setting device according to claim 7, wherein the vehicle attribute data includes data regarding one of size and weight of the vehicle.

10. A route setting device according to claim 7, wherein the vehicle attribute data includes data regarding the kinds of the vehicle.

11. A route setting device according to claim 6, wherein the vehicle relevant data collecting means uses data indicating a license number as the static data.

12. A route setting device according to claim 6, wherein the vehicle relevant data collecting means uses data regarding permission/prohibition condition of travel to a specific road.

13. A route setting device for setting a destination route from a departure point to a destination, comprising:

vehicle relevant data collecting means for collecting vehicle relevant data indicating whether a vehicle complies with a predetermined condition to travel a particular lane; and route setting means for setting the destination route based on link data of links connecting specific nodes and connection data between the specific links, wherein the route setting means sets the destination route including the particular lane by using a node and a link of the particular lane when the vehicle complies with the predetermined condition, further comprising a calendar and time calculator to calculate date and time, wherein the vehicle relevant data collecting means for collecting vehicle relevant data indicating whether the vehicle complies with the condition to travel the particular lane at the timing of calculated data and time.

14. A route setting device for setting a destination route from a departure point to a destination, comprising:

vehicle relevant data collecting means for collecting vehicle relevant data indicating whether a vehicle complies with a predetermined condition to travel a particular lane; and route setting means for setting the destination route based on link data of links connecting specific nodes and connection data between the specific links, wherein the route setting means sets the destination route including the particular lane by using a node and a link of the particular lane when the vehicle complies with the predetermined condition, wherein the vehicle relevant data collecting means includes:
manually input unit to which the driver manually inputs the vehicle relevant data indicating whether the vehicle complies with the condition to travel the particular lane.

15. A route setting device for setting a destination route from a departure point to a destination, comprising:
vehicle relevant data collecting means for collecting vehicle relevant data indicating whether a vehicle complies with a predetermined condition to travel a particular lane; and
route setting means for setting the destination route based on link data of links connecting specific nodes and connection data between the specific links, wherein the route setting means sets the destination route including the particular lane by using a node and a link of the particular lane when the vehicle complies with the predetermined condition,
wherein the route setting means sets the destination route without including the particular lane by using a node and a link of the particular lane when the vehicle does not comply with the predetermined condition.

16. A route setting device for setting a destination route from a departure point to a destination, comprising:
vehicle relevant data collecting means for collecting vehicle relevant data indicating whether a vehicle complies with a predetermined condition to travel a particular lane which only a vehicle with specific attribute passenger rides can travel; and
route setting means for setting the destination route based on link data of links connecting specific nodes and connection data between the specific links, wherein the route setting means sets the destination route including the particular lane by using a node and a link of the particular lane when the vehicle complies with the predetermined condition.

17. A route setting device according to claim 16, wherein:
the link data includes link class data for indicating the kinds of roads, and
the route setting means includes memory for storing the link class data.

18. A route setting device according to claim 16, further comprising arrival time calculating means for calculating a predicted arrival time to an entrance of the particular lane,
wherein the vehicle relevant data collecting means collects the vehicle relevant data at the predicted arrival time, and the route setting means sets the destination route in advance to an actual arrival to the entrance.

19. A route setting device according to claim 16, further comprising a calendar and time calculator to calculate date and time,
wherein the vehicle relevant data collecting means for collecting vehicle relevant data indicating whether the vehicle complies with the condition to travel the particular lane at the timing of calculated date and time.

20. A route setting device according to claim 16, wherein the vehicle relevant data collecting means includes:
manually input unit to which the driver manually inputs the vehicle relevant data indicating whether the vehicle complies with the condition to travel the particular lane.

21. A route setting device according to claim 16, wherein the route setting means sets the destination route without including the particular lane by using a node and a link of the particular lane when the vehicle does not comply with the predetermined condition.

22. Method of setting a destination route from a departure point to a destination, comprising the steps of:
collecting vehicle relevant data indicating whether a vehicle complies with a predetermined condition to travel a particular lane;
sequentially searching specific nodes from a search-start node corresponding to a start point to a search-end node corresponding to a destination and links connecting the specific nodes;
judging whether searched specific nodes and links include nodes and link of the particular lane;
judging whether the vehicle complies with the predetermined condition to travel the particular lane;
calculating route cost based on:
each specific nodes and links, when the searched specific nodes and links do not include the nodes and link of the particular lane or the vehicle does not comply with the predetermined condition to travel the particular lane,
each specific nodes and links, and nodes and link of the particular lane, when the searched specific nodes and links include the nodes and link of the particular lane and the vehicle complies with the predetermined condition to travel the particular lane.

23. Method of setting a destination route according to claim 22, further comprising the step of calculating a predicted arrival time to an entrance of the particular lane,
wherein the step of judging whether searched specific nodes and links include nodes and link of the particular lane judges based on data of the particular lane at the predicted arrival time.

24. Method of setting a destination route according to claim 22, further comprising the step of collecting vehicle relevant data indicating whether the vehicle complies with the condition to travel the particular lane at the timing of calculated date and time.

25. Method of setting a destination route according to claim 22, wherein the vehicle relevant data collecting step includes a step of requesting input of vehicle relevant data by user.

26. Method of setting a destination route according to claim 25, wherein the requesting step includes step of displaying a notice on a display and outputting voice sound from a speaker.

27. Method of setting a destination route according to claim 22, wherein the step of judging whether the vehicle complies with the predetermined condition to travel the particular lane is executed when the vehicle stops.

28. Method of setting a destination route according to claim 22, wherein the step of judging whether the vehicle complies with the predetermined condition to travel the particular lane is executed when one of d oors of the vehice is opened.

* * * * *